United States Patent
Mengel et al.

Patent Number: 5,966,945
Date of Patent: Oct. 19, 1999

[54] UNIVERSAL FOCAL PLANE DEWAR ASSEMBLY

[76] Inventors: Edward M. Mengel, c/o Teltron Technologies, Birdsboro, Pa. 19508; Richard L. Kies, Jr., 9850 Roberts Rd., Sauquoit, N.Y. 13456

[21] Appl. No.: 09/092,507

[22] Filed: Jun. 5, 1998

[51] Int. Cl.⁶ .............................. F25B 19/00; G01J 5/06
[52] U.S. Cl. .......................... 62/51.1; 62/259.2; 250/352
[58] Field of Search .................... 62/51.1, 259.2, 62/331, 298; 250/352

[56] References Cited

U.S. PATENT DOCUMENTS

| | | | |
|---|---|---|---|
| 5,317,157 | 5/1994 | Yoshida et al. | 250/352 |
| 5,404,016 | 4/1995 | Boyd et al. | 250/352 |
| 5,834,778 | 11/1998 | Veyrier et al. | 250/352 |

Primary Examiner—William Doerrler
Attorney, Agent, or Firm—Zachary T. Wobensmith, III

[57] ABSTRACT

A universal focal plane DEWAR assembly for cryogenic cooling of an infrared detector DEWAR, which includes an infrared transmissive window attached to a hollow support cylinder under vacuum conditions, with a glass bore in the cylinder, which contains focal plane infrared structure inside of a cold shield, which is attached to a cold plate, with a cold button in contact therewith, and with a cold finger from a cryogenically cooled expander, which is spring mounted in the glass bore for removal and replacement without disturbing the focal plane structure.

5 Claims, 1 Drawing Sheet

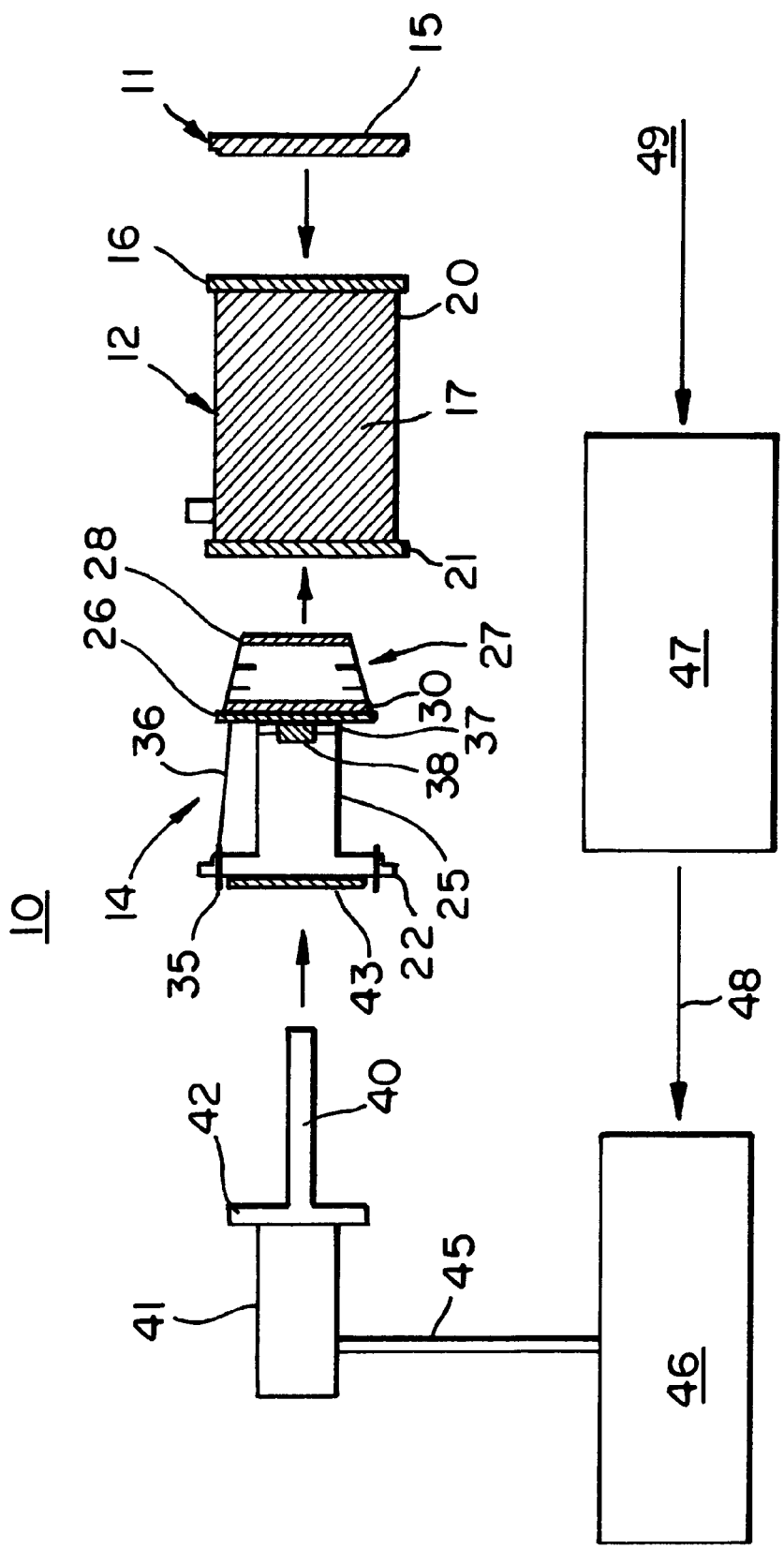
FIG.

UNIVERSAL FOCAL PLANE DEWAR ASSEMBLY

BACKGROUND OF THE INVENTION

1. Field of the Invention

This invention relates to a universal focal plane DEWAR assembly and more particularly to a glass infrared detector DEWAR of the cryogenically cooled type, which is of three components, a front window, a glass housing and glass bore, wherein the expander and cold finger is not integral with the assembly.

2. Description of the Prior Art

Infrared detectors and sensors (IFA) integrated focal plane arrays such as used with infrared cameras require cooling, and often use expanders and cold fingers as part of their cryogenic cooling systems which are integrated into a welded enclosure which complicates servicing the system. The cryogenic cooling systems have relatively short lives, are expensive to replace, and by the nature of their construction there is a large risk of damage to the focal plane of the assembly when the cryogenic cooling system requires rework, and/or replacement.

The unavailability of reliable low-cost cryocoolers for use with electronic devices has been known in the industry, and is extensively discussed in an article in the publication *Superconductor Industry*, issue fall of 1992, entitled: Building The Better Cryocooler, pages 22–28. The universal focal plane DEWAR assembly of the invention is easy to assemble and disassemble, and does not suffer from the shortcomings of the previously available devices.

SUMMARY OF THE INVENTION

It has now been found that a universal focal plane DEWAR assembly is available that is of three component construction, with cryogenic cooling that utilizes a compression attached cold finger interface, which allows for easy replacement of the cooling assembly without disturbing the focal plane structure.

The principal object of the invention is to provide a universal focal plane DEWAR assembly that is easy to assemble and disassemble for service.

A further object of the invention is to provide an assembly that lends itself to mass production.

A further object of the invention is to provide an assembly that includes a non-wavelength specific cooling platform.

A further object of the invention is to provide an assembly that is inexpensive to produce.

A further object of the invention is to provide an assembly that allows universal interchangeability of focal plane DEWARS that operate at different infrared wavelengths.

Other objects and advantageous features of the invention will be apparent from the description and claims.

DESCRIPTION OF THE DRAWINGS

The nature and characteristic features of the invention will be more readily understood from the following description taken in connection with the accompanying drawing forming part hereof in which:

The FIGURE is a diagrammatic view of the universal focal plane DEWAR assembly of the invention.

It should, of course, be understood that the description and drawing herein are merely illustrative and that various modifications and changes can be made in the structure disclosed without departing from the spirit of the invention.

DESCRIPTION OF THE PREFERRED EMBODIMENT

When referring to the preferred embodiment, certain terminology will be utilized for the sake of clarity. Use of such terminology is intended to encompass not only the described embodiment, but also technical equivalents which operate and function in substantially the same way to bring about the same result.

Referring now more particularly to the FIGURE a universal focal plane assembly 10 is therein illustrated which is shown as a cryogenically cooled infrared detector DEWAR assembly for use with infrared cameras, but which could be used with other integrated focal plane arrays.

The assembly 10 includes three components, i.e., an infrared transmissive window 11, a midsection support cylinder or glass housing 12 and a glass bore 14. The window 11 is of conventional type with its characteristics selected to match the optimum transmission requirements for the infrared spectrum to be transmitted. The window 11 is coated with an EMI conductive coating 15 to shield the window from outside electromagnetic interference. The window 11 which is illustrated of circular configuration is cold pressed into a front indium seal 16 of well known type, which is carried on the cylinder 12. The cylinder 12 is of hollow circular configuration, with an inner coating of metalized silver 17 to reflect the cryogenic cold temperature emitted from the cold shield back on itself, to be described. The normal glass wall temperature, which is in excess of 273 degrees Kelvin, is insulated by the coating 17 reducing the cooling load of the emitted cryogenic cold. The coating 17 being of metal also acts to shield the interior of cylinder 12 from external electromagnetic interference with the focal plane read out scanner and mixing circuitry.

The outside surface of cylinder 12 is provided with a coating 20 of electromagnetic conductive material of well known type, to provide enhanced electromagnetic interference rejection.

The cylinder 12 has a rear indium seal 21, of well known type similar to front seal 16, with a flange 22 of the glass bore 14 cold pressed into the seal 21.

The glass bore 14 includes a hollow cylindrical projection 25, with a moly tab cold plate 26 attached thereto, in well known manner such as by adhesive or fusing. A cold shield 27 is attached to the cold plate 26 in well known manner, such as by adhesive or fusing, which shield is of tapered construction with an infrared spectral filter 28 attached to the end of shield 27. A focal plane substrate 30, of well known type, is attached to the cold plate 26 inside of the cold shield 27. The focal plane substrate 30 is electrically attached to pins 35 carried in flange 27, by a one or two mil diameter bronze connection wire 36. The small size of the wire reduces migration of heat from the glass onto the cold plate 26, and also provides strength and relatively high thermal resistance.

Within the projection 25 a thermal insulator 37 is provided mounted to the cold plate 26, with a cold button 38 surrounded by the insulator 37 also mounted to and in contact with the cold plate 26. The cold button 38 is preferably a cubic serconium cold button of well known type, which transfers heat from the cold plate 26.

A cold finger 40 is provided, in contact with the button 38, and mounted to an expander 41, which finger has a flange 42 detachably mounted to an invar metal flange 43, which is fused to the glass bore 14. The expander flange 42 is mounted to the flange 43 by spring loaded hardware (not shown) of well known type, which permits constant pressure on the cold button 38 for optimum heat transfer, and which permits thermal expansion of the cold finger 40 as the expander 41 cools the focal plane structure. The expander 41 has an expander line 45 connected thereto and to a cooler 46, which is preferably a Raytheon model 7049, one and one half watt linear cooler, which cools the expander 41.

The cooler 46 has a cryo control power supply 47, preferably an Adde Co. No. 7049 cryo control power supply, connected thereto by line 48 which is connected to a 28 volt D.C. power input supply 49.

In operation the assembly 10 is constructed as described with the cryogenic cooling portion expander 41 attached by a spring loaded mounting (not shown) as described. The cylinder 12 is provided with a glass pumping port 51 to remove air in the cylinder in a pumping station (not shown), so as to vacuum bake the DEWAR to the hard levels required for efficient cryogenic cooling of the focal plane and cold shield, and the port 51 is sealed in well known manner, preferably by a hot hydrogen gas flame prior to removal from the pumping station (not shown).

The glass bore 14 and window 11 are assembled to the cylinder 12. The expander 41 and cold finger 40 can be removed from the glass bore 14 by detachment of flange 42 from glass bore metal flange 43, for repair and/or replacement without damage to the focal plane substrate 30, or the cold shield 26, or other structure.

The expander 41 and cold finger 40 after repair can be assembled into the glass bore without contacting the focal plane substrate 30.

It will thus be seen that a universal focal plane DEWAR assembly has been provided with which the objects of the invention are attained.

We claim:

1. A universal focal plane DEWAR assembly for detecting infrared waves, of three component construction, which is cryogenically cooled, the improvement which comprises
    a midsection support cylinder of hollow construction,
    a cold seal at the front of said cylinder,
    an infrared transmissive window detachably engaged with said front seal,
    a rear cold seal at the rear of said cylinder,
    glass bore means mounted in said support cylinder in contact with said rear seal,
    said glass bore means includes a hollow cylindrical projection,
    a cold plate attached to said cylindrical projection,
    a cold shield attached to said cold plate,
    an infrared spectral filter detachably engaged with said cold shield,
    a focal plane substrate in said cold shield, attached to said cold plate,
    electrical connection means attached to said focal plane substrate,
    a thermal insulator in said cylindrical projection in contact with said cold plate,
    a cold button in said cylindrical projection in contact with said cold plate,
    cryogenic cooling means removably mounted in said glass bore in contact with said cold button for cooling said button and said cold plate.

2. A universal focal plane DEWAR assembly as defined in claim 1 in which
    said front and rear cold seals are of indium.

3. A universal focal plane DEWAR assembly as defined in claim 1 in which
    said cryogenic cooling means includes an expander,
    a flange on said expander,
    a flange on said glass bore for engagement with said expander flange,
    a cold finger extending from said expander in pressure contact with said cold button to cool said button,
    spring means to mount said expander flange to said glass bore flange and urge said cold finger into contact with said cold button and
    a cryogenic cooler in communication with said expander for cooling thereof.

4. A universal focal plane DEWAR assembly as defined in claim 1 in which
    said support cylinder has a coating of metal on its inner surface and a coating of electromagnetic conductive material on its outer surface.

5. a universal focal plane DEWAR assembly as defined in claim 1 in which
    said infrared transmissive window has a coating of electro-magnetic conductive material thereon.

* * * * *